H. G. & A. W. POSSNER.
CRANK HANDLE HOLDER FOR AUTOMOBILES.
APPLICATION FILED MAY 5, 1914.
1,108,230.
Patented Aug. 25, 1914.
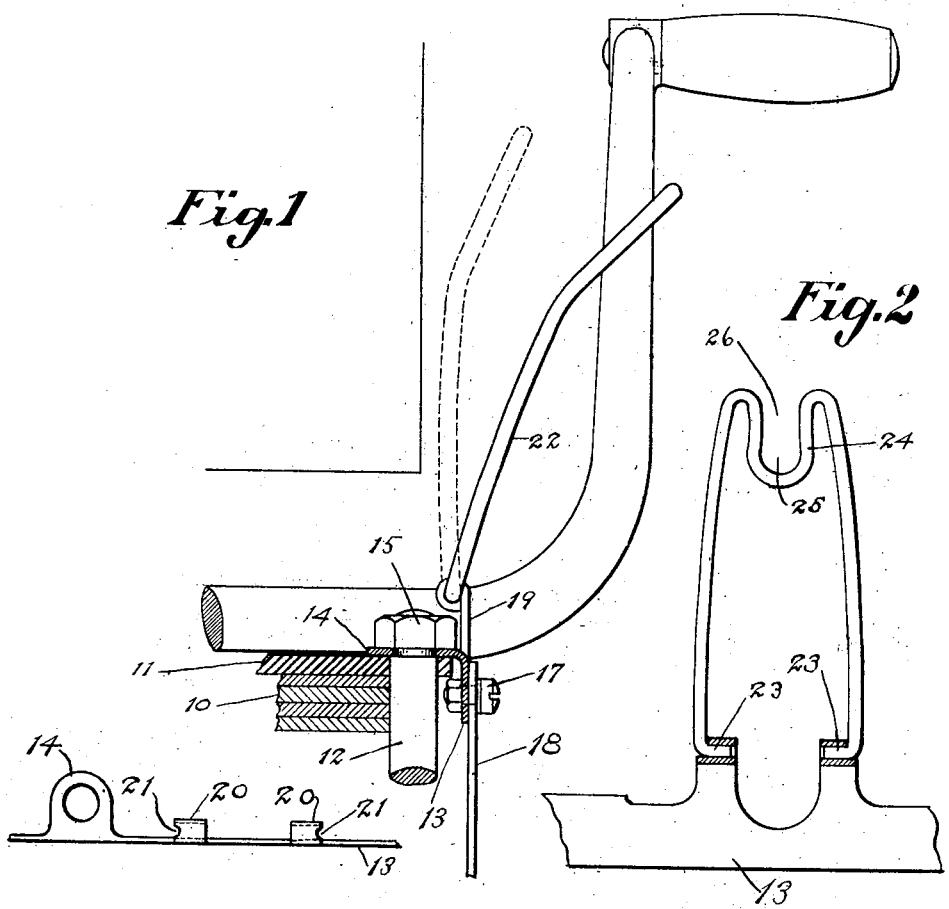
Witnesses
Augustus F. Friend
A. F. Macready
Inventors
Herman G. Possner
Albert W. Possner
By
Howard G. Barlow
Attorney

UNITED STATES PATENT OFFICE.

HERMAN G. POSSNER AND ALBERT W. POSSNER, OF PROVIDENCE, RHODE ISLAND.

CRANK-HANDLE HOLDER FOR AUTOMOBILES.

1,108,230.

Specification of Letters Patent. Patented Aug. 25, 1914.

Application filed May 5, 1914. Serial No. 836,585.

*To all whom it may concern:*

Be it known that we, HERMAN G. POSSNER and ALBERT W. POSSNER, citizens of the United States, and residents of the city of Providence, in the county of Providence and State of Rhode Island, have invented certain new and useful Improvements in Crank-Handle Holders for Automobiles, of which the following is a specification.

This invention relates to a crank handle holder for automobiles and has for its object to provide a simple, inexpensive and yet practical holder of this character comprising a base plate adapted to be readily connected to the vehicle frame, the same being provided with joint fingers in which the holder arm is pivotally held by the inherent spring in its stock said arm being bent at its outer end into a U shape to engage the handle with spring pressure to prevent rattling of the parts.

A further object of the invention is the provision of means whereby the arm is releasably held in operative position when swung back out of engagement with the handle.

With these and other objects in view, the invention consists of certain novel features of construction, as will be more fully described and particularly pointed out in the appended claims.

In the accompanying drawing:—Figure 1 is a side elevation in section showing a base plate as secured to the frame of the automobile and the holder arm as engaging the crank handle. Fig. 2 is a front view showing the holder arm as engaging the joint bearings by spring pressure. Fig. 3 is a perspective view of the base plate. Fig. 4 is an edge view of the base plate showing the retaining notches in the joint bearings.

My improved crank handle holder is more particularly adapted for use on a certain type of automobiles, which in its construction is provided with a front spring 10, which sets transversely thereof, and which is clamped to the cross bar or member of the arm 11 by means of a clamp yoke 12, the base member 13 is preferably formed of an elongated strip of sheet metal having rearwardly bent ears 14 adapted to engage and be bound to the yoke 12 by their binding nuts 15. The body portion of this base member is preferably slotted as at 16 near its ends to receive binding screws 17 and so serve as a support for the registry number plate 18. This base plate is also provided with a pair of upwardly extending fingers 19, having their upper ends bent or rolled over back as at 20 forming bearings. The stock at the upper edge of these bearings as at 21 is cut out or notched for the purpose presently described. The essential feature of this base plate is its function of serving as a bearing or support in which the crank supporting arm 22 is pivotally mounted. This crank supporting arm is as is shown in Fig. 2 preferably made of round wire bent into an elongated loop the ends 23 of the legs of the loop being turned inward at substantially right angles whereby the legs may be sprung apart to permit their ends to enter the bearings 20 to be retained therein by this inherent spring pressure of the legs. The bridge portion of this loop or retaining arm is itself bent into a U shape forming a recess 25 for the reception of the crank handle, the entrance or mouth 26 of this recess being slightly smaller than that portion of the crank handle engaged by it, whereby when forced over the handle it grips the same by spring pressure which prevents the parts from rattling.

Another feature of the invention is the provision of the notches 21 in the edge of the bearing fingers, which serve to receive and retain the said legs of the loop shaped arm 22 when it is thrown out of engagement with the crank handle back into inoperative position as illustrated in dotted lines in Fig. 1.

In the construction of our improved crank handle holder, a base plate 13 is formed to serve a double purpose first, it serves as a bearing in which the crank retaining arm is pivotally held and second it may serve as a support for the registry number plate of the vehicle and this base plate is preferably made of one integral piece of sheet metal bent into the desired shape.

We have described the crank engaging arm as being constructed of wire and in a loop or U form, but the same may be constructed of any suitable resilient metal and in any suitable shape, the essential feature of this construction being that the ends of the legs are turned at substantially right angles, to be inserted into the bearings in the base plate whereby the retaining arm may be swung into position to engage the crank handle and then when the crank handle is in use the arm may be swung back out of engagement therewith.

We claim:

1. An auto crank handle holder comprising a base plate having ears adapted to be readily secured to the frame of the vehicle, fingers on said plate having joint eyes, a holder arm constructed of a thin strip of resilient metal having its ends turned substantially at right angles to the body thereof and engaging said joint eyes by spring pressure, the outer portion of said arm being bent in a U shape to receive and grip the handle to hold the same in desired position and means in said joint finger for retaining said arm in inoperative position.

2. An auto crank handle holder comprising a base plate having ears adapted to be readily secured to the frame of the vehicle, fingers on said plate having joint eyes, the stock in the edges of said eyes being notched, a holder arm constructed of a spring wire bent in substantially an inverted U shape to receive and grip the handle to hold it in desired position, the notches in said eyes being adapted to receive and retain the legs of the arm when swinging back into disengaged position.

3. An auto crank handle holder comprising a base plate formed to be readily secured to the frame of the vehicle, a holder arm constructed of a thin strip of resilient metal having its ends pivotally connected to said plate, the outer portion of said arm being bent in a U shape to receive and grip the handle by a spring pressure to hold the same in desired position and means for retaining said arm in inoperative position.

In testimony whereof we affix our signatures in presence of two witnesses.

HERMAN G. POSSNER.
ALBERT W. POSSNER.

Witnesses:
HOWARD E. BARLOW,
A. F. MACREADY.